(12) United States Patent
Furukawa

(10) Patent No.: US 11,668,578 B2
(45) Date of Patent: Jun. 6, 2023

(54) INTERACTION DEVICE, INTERACTION METHOD, AND STORAGE MEDIUM STORING PROGRAM

(71) Applicant: TOYOTA JIDOSHA KABUSHIKI KAISHA, Toyota (JP)

(72) Inventor: Daisuke Furukawa, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/305,671

(22) Filed: Jul. 13, 2021

(65) Prior Publication Data
US 2022/0034674 A1 Feb. 3, 2022

(30) Foreign Application Priority Data

Jul. 28, 2020 (JP) ............................. JP2020-127672

(51) Int. Cl.
*G01C 21/34* (2006.01)
*B60Q 9/00* (2006.01)

(52) U.S. Cl.
CPC .......... *G01C 21/3484* (2013.01); *B60Q 9/00* (2013.01)

(58) Field of Classification Search
CPC .............................. G01C 21/3484; B60Q 9/00
See application file for complete search history.

(56) References Cited

U.S. PATENT DOCUMENTS

2015/0239477 A1* 8/2015 Kitagawa ........... G01C 21/3407
701/1
2017/0080856 A1* 3/2017 Enomoto ................. B60Q 9/00
2019/0276047 A1* 9/2019 Suzuki ..................... G08B 3/10
2019/0295400 A1 9/2019 Yamaguchi
2020/0309548 A1* 10/2020 Shintani ................. G06V 20/59

FOREIGN PATENT DOCUMENTS

| JP | 2008077189 A | * | 4/2008 |
| JP | 2015-162087 A | | 9/2015 |
| JP | 2016207001 A | * | 12/2016 |
| JP | 2017-207997 A | | 11/2017 |
| JP | 2019-159711 A | | 9/2019 |
| WO | WO-2016114918 A1 | * | 7/2016 ......... G01C 21/3415 |

OTHER PUBLICATIONS

Machine Transition JP 2008077189 (Year: 2008).*
JP_2008077189_machine_translation (Year: 2008).*
JP_2016207001_A_I_machine_translation (Year: 2016).*

* cited by examiner

*Primary Examiner* — Anne Marie Antonucci
*Assistant Examiner* — Patrick M Brady
(74) *Attorney, Agent, or Firm* — Oblon, McClelland, Maier & Neustadt, L.L.P.

(57) ABSTRACT

An interaction device include a processor. The processor being configured to acquire an alertness level of an occupant of a vehicle, request an utterance from the occupant in a case in which the acquired alertness level is below a threshold value, identify a rest point at which the vehicle can stop, measure a cycle spanning from initiation of an interaction until the alertness level falls below the threshold value again, and repeatedly request an utterance from the occupant at a regular interval that is shorter than the measured cycle during a time period from notifying the occupant that the rest point has been set as a destination of the vehicle to the vehicle arriving at the destination.

13 Claims, 12 Drawing Sheets

FIG.4

| MEDIA CONTENT | NEWS | MUSIC | AUDIOBOOK | HOBBY INFORMATION |
|---|---|---|---|---|
| ROUSING EFFICACY LEVEL | B | A | C | B |

FIG.5A

| INFORMATION TYPE | LITTLE CONGESTION ON WAY TO REST POINT | LIGHT TRAFFIC ON WAY TO REST POINT | EATING FACILITIES AT REST POINT | POSSIBLE TO REFUEL AT REST POINT |
|---|---|---|---|---|
| USEFULNESS | 1.0 | 0.9 | 0.7 | 0.5 |

FIG.5B

| INFORMATION TYPE | EATING | SHOPPING | EASE OF PARKING | SCENERY |
|---|---|---|---|---|
| PREFERENCE LEVEL | A | C | B | D |

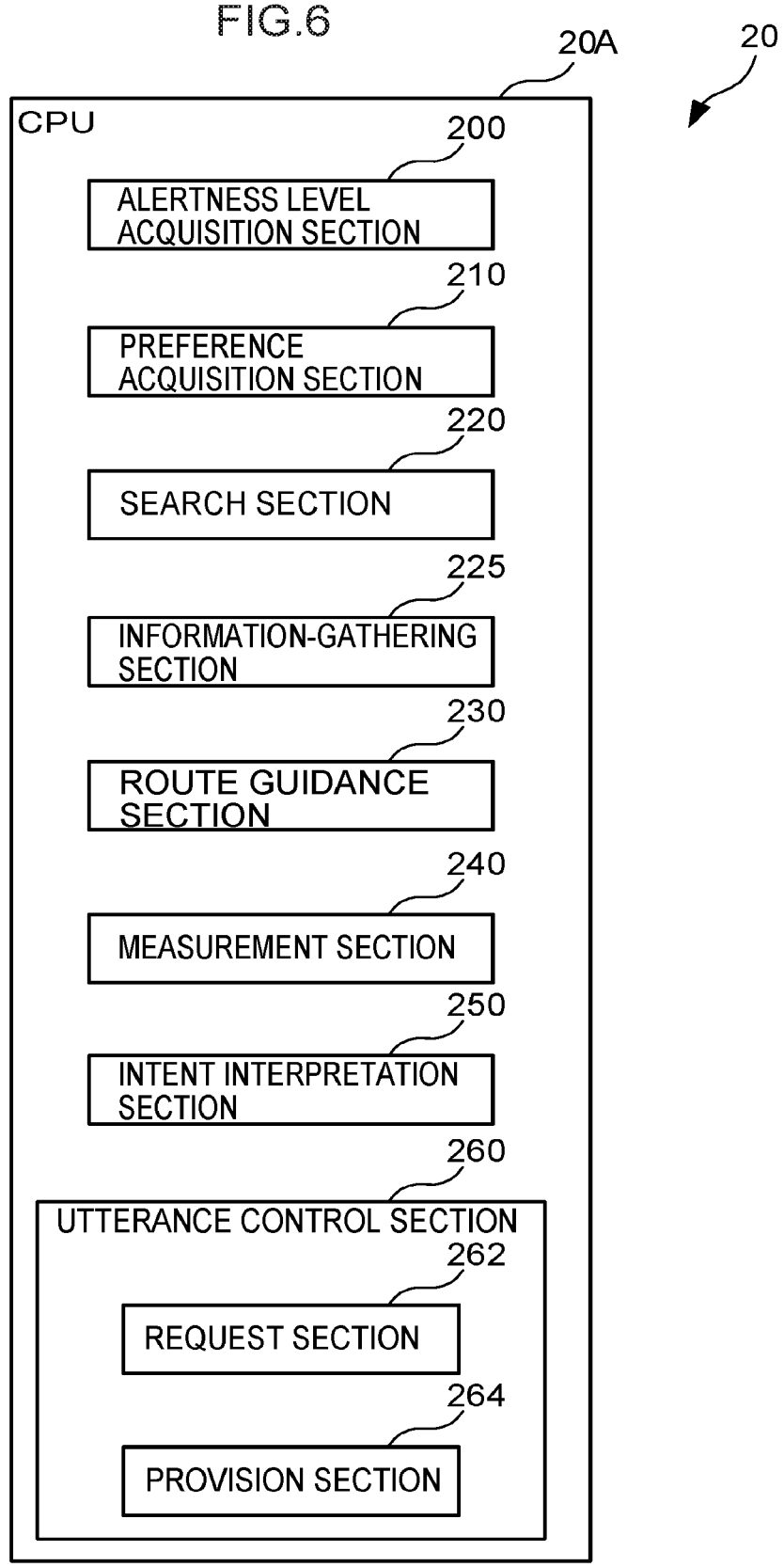

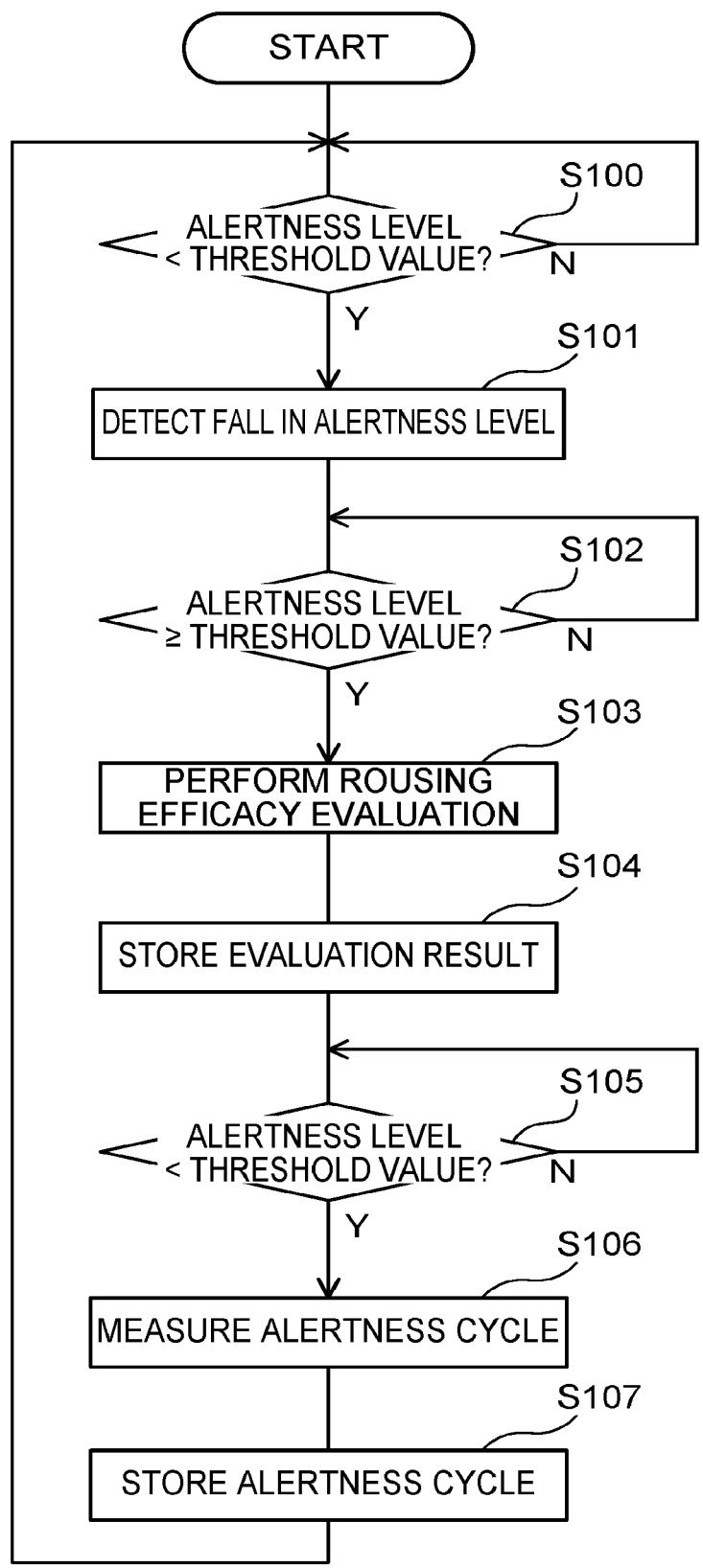

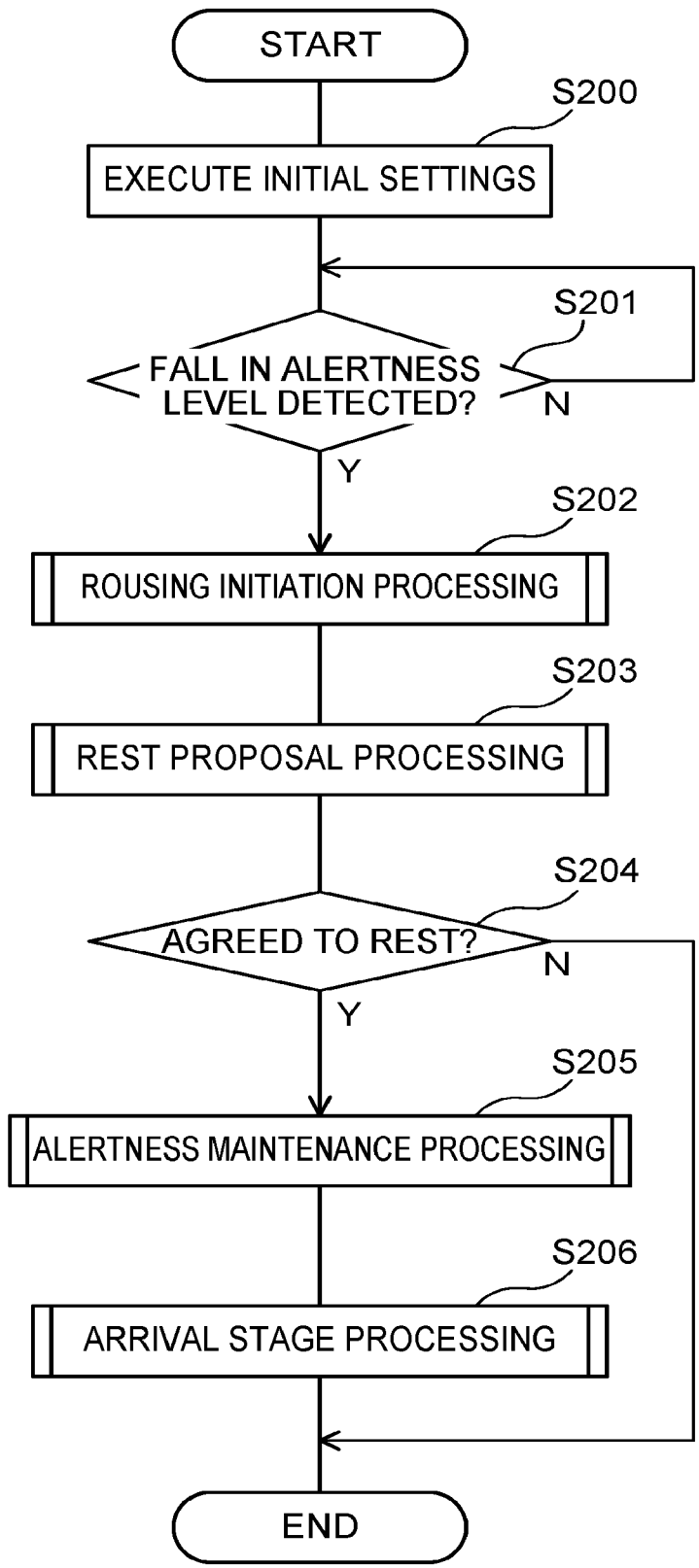

INTERACTION DEVICE, INTERACTION METHOD, AND STORAGE MEDIUM STORING PROGRAM

CROSS-REFERENCE TO RELATED APPLICATION

This application is based on and claims priority under 35 USC 119 from Japanese Patent Application No. 2020-127672 filed on Jul. 28, 2020, the disclosure of which is incorporated by reference herein.

BACKGROUND

Technical Field

The present disclosure relates to an interaction device, an interaction method, and a storage medium storing a program to rouse an occupant of a vehicle.

Related Art

Japanese Patent Application Laid-Open (JP-A) No. 2015-162087 discloses an in-vehicle system that restores a driver from a state of reduced alertness. When this in-vehicle system determines that the driver is unfocused or dozing, the in-vehicle system chooses and informs the driver of a rest location at which the driver can rest. The in-vehicle system also executes a periodical operation to restore the driver from their unfocused or dozing state until arriving at the chosen rest location.

JP-A No. 2019-159711 discloses an alertness level maintaining device that helps to suppress fluctuations in an alertness level of a driver and maintain a relatively high alertness level. In this alertness level maintaining device, interaction with the driver is executed at random intervals.

An operation to rouse the driver may be executed repeatedly in order to convey the remaining time and distance to a rest point to the driver. However, in the in-vehicle system disclosed in JP-A No. 2015-162087, although the operation to rouse the driver is executed periodically, for some drivers this operation may be executed after their alertness level has already dropped, and so there is room for improvement in this respect.

In the case of the alertness level maintaining device disclosed in JP-A No. 2019-159711, the timing of the interaction is different on each occasion, and so it is difficult to convey the remaining time and distance to the rest point.

SUMMARY

An object of the present disclosure is to provide an interaction device, an interaction method, and a storage medium storing a program that convey the remaining time and distance to a destination simply, and that secure a rousing effect regardless of differences between individual occupants when executing an interaction repeatedly until reaching the destination.

A first aspect is an interaction device including an acquisition section configured to acquire an alertness level of an occupant of a vehicle, a request section configured to request an utterance from the occupant in cases in which the alertness level acquired by the acquisition section is below a threshold value, a search section configured to identify a rest point at which the vehicle can stop, and a measurement section configured to measure a cycle spanning from initiation of an interaction until the alertness level falls below the threshold value again. The request section is configured to repeatedly request an utterance from the occupant at a regular interval that is shorter than the measured cycle during a time period from notifying the occupant that the rest point has been set as a destination of the vehicle to the vehicle arriving at the destination.

In the interaction device of the first aspect, the acquisition section acquires the alertness level of the occupant, and then the request section compares this alertness level against the threshold value and requests an utterance from the occupant in cases in which the alertness level is below the threshold value. The search section of the interaction device identifies a rest point at which the vehicle can stop, and notifies the occupant that this rest point has been set as the destination of the vehicle. Moreover, the measurement section of the interaction device measures an alertness level cycle spanning from the initiation of interaction to when the alertness level falls below the threshold value again, and the request section repeatedly requests an utterance at the regular interval that is shorter than the measured cycle until the vehicle arrives at the destination.

According to this interaction device, by executing repeated interactions until reaching the destination, the occupant is prompted to make a fresh utterance before their falling alertness level reaches the threshold value, based on the measured alertness level of the occupant. This enables a rousing effect to be secured, regardless of differences between individual occupants. Moreover, prompting an utterance at the regular interval set based on the measured alertness level enables the remaining time and distance to the destination to be conveyed to the occupant simply.

An interaction device of a second aspect is the interaction device of the first aspect, wherein the request section is configured to request an utterance by prioritizing use of media content that effectively rouses the occupant from plural media content for rousing the occupant.

According to the interaction device of the second aspect, the rousing effect can be enhanced compared to cases in which an utterance is requested without consideration of whether or not the media content rouses the occupant effectively.

An interaction device of a third aspect is the interaction device of the second aspect, further including a storage section that is configured to store a degree of recovery of the alertness level together with the media content used, wherein the request section is configured to request an utterance by referencing the storage section so as to prioritize use of media content associated with a high degree of recovery.

In the interaction device of the third aspect, the media content employed for rousing of the occupant and the degree of recovery of the alertness level are stored together in the storage section, and the request section prioritizes the use of media content associated with a high degree of recovery. This interaction device is thus capable of using media content chosen based on the past rousing effect with respect to the occupant, thereby enabling the rousing effect to be further enhanced.

An interaction device of a fourth aspect is the interaction device of the second aspect or the third aspect, wherein the request section is configured to vary the media content each time an utterance request is repeated.

According to the interaction device of the fourth aspect, varying the media content each time an utterance request is repeated enables desensitization resulting from using the same media content each time to be suppressed.

The present disclosure is capable of conveying the remaining time and distance to a destination simply, and of securing a rousing effect regardless of differences between individual occupants when executing an interaction repeatedly until reaching the destination.

BRIEF DESCRIPTION OF THE DRAWINGS

Exemplary embodiments of the present disclosure will be described in detail based on the following figures, wherein:

FIG. 4 is a table illustrating contents of rousing efficacy level data of the first exemplary embodiment;

FIG. 5A is a table illustrating contents of priority condition data of the first exemplary embodiment in an example in which usefulness is a condition;

FIG. 5B is a table illustrating contents of priority condition data of the first exemplary embodiment in an example in which a preference level is a condition;

FIG. 6 is a block diagram illustrating a functional configuration of a head unit of the first exemplary embodiment;

FIG. 7 is a flowchart illustrating a flow of alertness level detection processing of the first exemplary embodiment;

FIG. 8 is a flowchart illustrating a flow of rousing processing of the first exemplary embodiment;

DETAILED DESCRIPTION

First Exemplary Embodiment

Configuration

Figure 1:
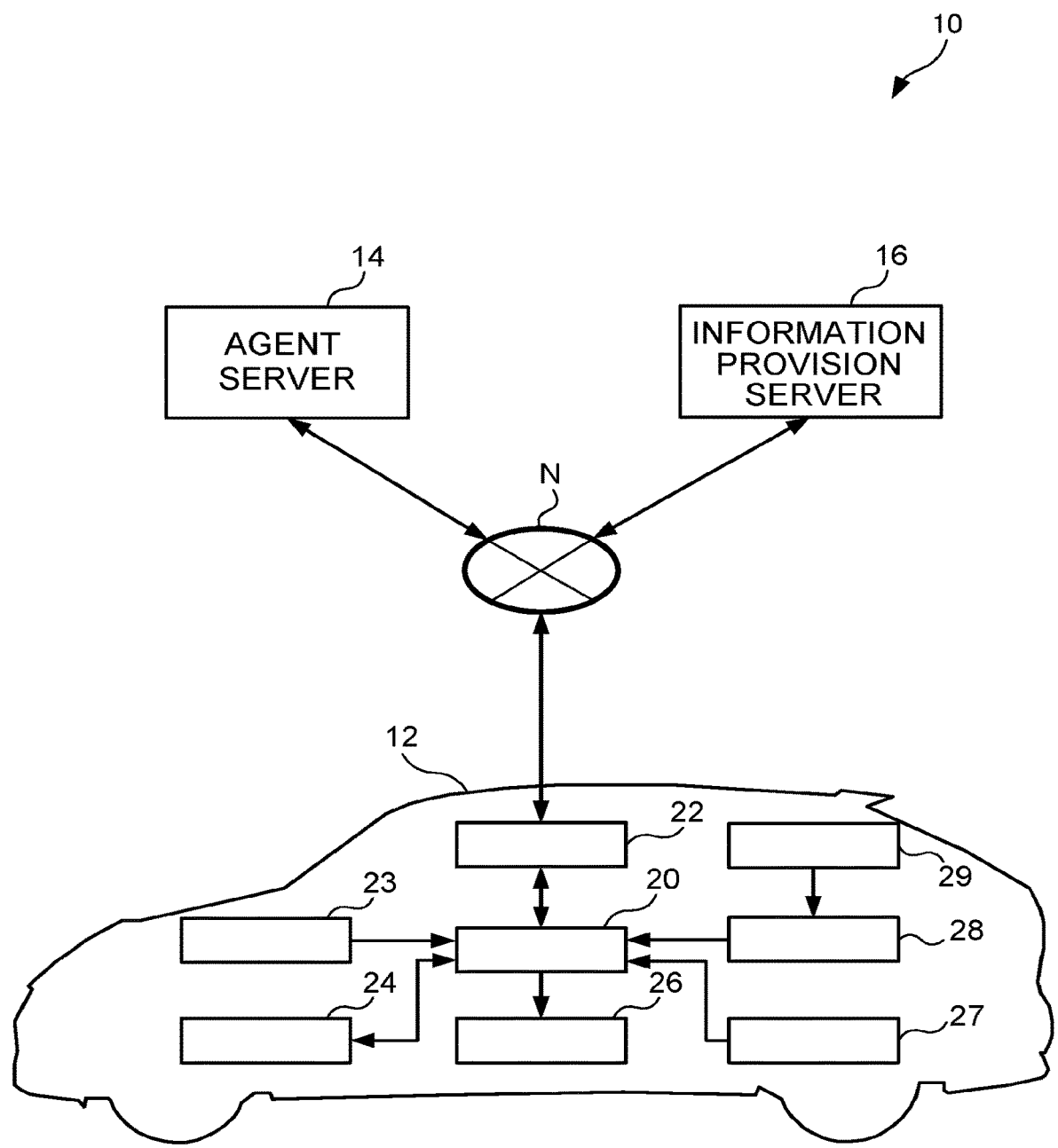
FIG. 1 is a diagram illustrating a schematic configuration of an rousing system according to a first exemplary embodiment.
Figure 2:
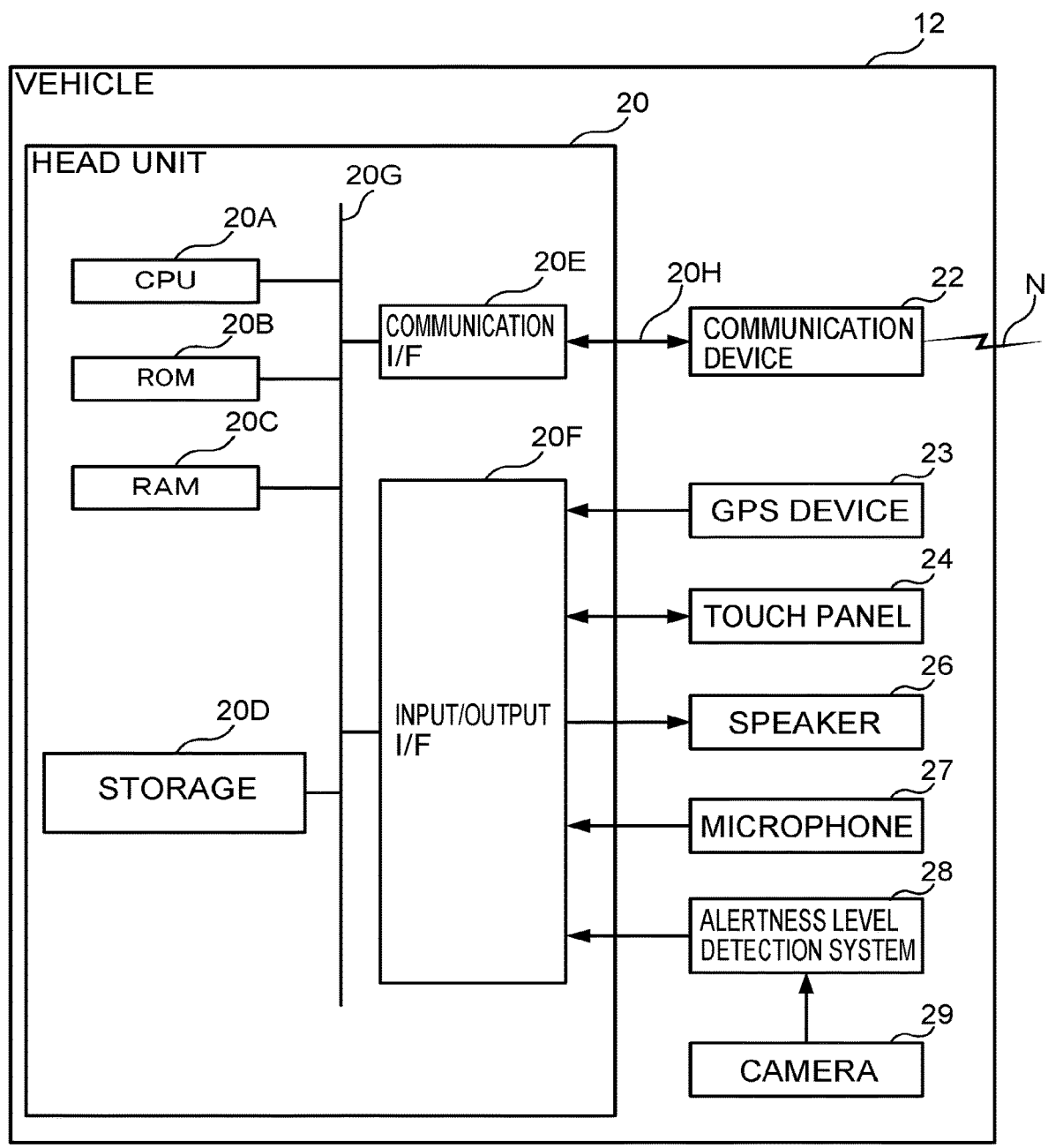
FIG. 2 is a block diagram illustrating a hardware configuration of a vehicle of the first exemplary embodiment.

As illustrated in FIG. 1 and FIG. 2, a rousing system 10 of a first exemplary embodiment is configured including a vehicle 12, an agent server 14, and an information provision server 16. A head unit 20 serving as an interaction device, a communication device 22, a global positioning system (GPS) device 23, a touch panel 24, a speaker 26, a microphone 27, an alertness level detection system 28, and a camera 29 are installed in the vehicle 12. The communication device 22 of the vehicle 12, the agent server 14, and the information provision server 16 are connected to each other over a network N.

The agent server 14 includes functionality to provide agent-related services, such as music streaming, information provision, and telephone calls, for an occupant of the vehicle 12. The agent server 14 interprets the intent of an utterance by the occupant based on audio information from the occupant acquired through the head unit 20, and provides information corresponding to the interpreted intent of the occupant to the head unit 20.

The information provision server 16 includes functionality to provide media content used when the agent is executed through the head unit 20. The information provision server 16 provides requested media content to the head unit 20 based on a request from the head unit 20 or the agent server 14.

As illustrated in FIG. 2, the head unit 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RANI 20C, the storage 20D, the communication I/F 20E, and the input/output I/F 20F are connected together so as to be capable of communicating with each other through an internal bus 20G.

The CPU 20A is a central processing unit that executes various programs and controls various sections. Namely, the CPU 20A reads a program from the ROM 20B or the storage 20D, and executes the program using the RAM 20C as a workspace. The CPU 20A is an example of a processor.

The ROM 20B stores various programs and various data.

The RAM 20C acts as a workspace to temporarily store programs or data.

Figure 3:
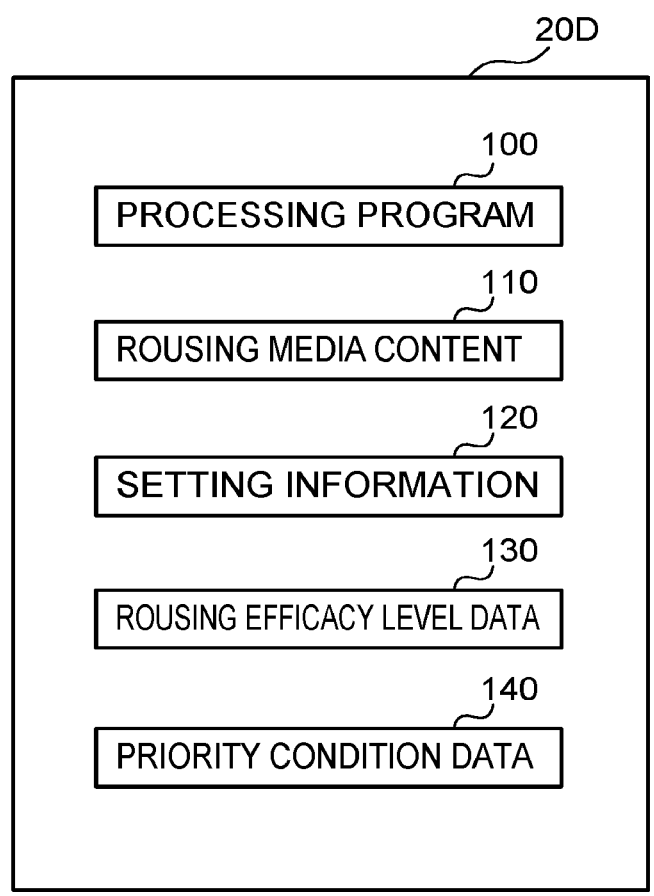
FIG. 3 is a block diagram illustrating a configuration of storage of the first exemplary embodiment.

The storage 20D serves as a storage section and is configured by a hard disk drive (HDD) or a solid state drive (SSD) that stores various programs and various data. As illustrated in FIG. 3, a processing program 100, rousing media content 110, setting information 120, rousing efficacy level data 130, and priority condition data 140 are stored in the storage 20D of the present exemplary embodiment. Note that the processing program 100, the rousing media content 110, the setting information 120, the rousing efficacy level data 130, and the priority condition data 140 may be stored in the ROM 20B.

The processing program 100 is a program for controlling the head unit 20 that serves as an interaction device.

Information such as song data, audio data, and text is stored as the rousing media content 110 as media content for rousing the occupant. Note that the media content stored as the rousing media content 110 is not necessarily stored as full data, and may be stored in the form of an address (i.e. a link) for an external server.

Setting contents such as permissions to actuate a rousing function and agent voices, as well as personal information such as the name of the occupant using the rousing function, are stored in the setting information 120.

The efficacy of each type of media content in rousing the occupant is stored in the rousing efficacy level data 130. As illustrated in FIG. 4, the rousing efficacy stored in the rousing efficacy level data 130 is stored as a rousing efficacy level for respective types of media content. The example in FIG. 4 illustrates rousing efficacy levels for a given occupant. Specifically, of media content that may be provided when the rousing function has been actuated, news is set to a rousing efficacy level B, music is set to a rousing efficacy level A, audiobooks are set to a rousing efficacy level C, and hobby information is set to a rousing efficacy level B. The rousing efficacy level A is the level that rouses most effectively, and the rousing efficacy level decreases on progression to B and C.

Predetermined conditions regarding which rest point to prioritize for provision to the occupant in cases in which plural rest points, described later, have been selected are stored in the priority condition data 140. The predetermined conditions include the usefulness of the information to the occupant (Condition 1), preference levels of the occupant (Condition 2), and frequency of past selection by the occupant (Condition 3). Note that any one out of Condition 1 to Condition 3 may be applied singularly, or a combination of these conditions may be applied. In cases in which a combination of these conditions is applied, the respective conditions may be weighted.

As illustrated in FIG. 5A, Condition 1, this being the usefulness of the information to the occupant, is stipulated for each of respective information types provided to the occupant. A provision section 264, described later, compares the calculated usefulness of each information type so as to prioritize suggesting to the occupant the rest point that is the most useful, namely the best suited to them. In the example in FIG. 5A, the usefulness is set to 1.0 for "little congestion on way to rest point", 0.9 for "light traffic on way to rest point", 0.7 for "eating facilities at rest point", and 0.5 for "possible to refuel at rest point". Note that the information such as "little congestion on way to rest point", "light traffic on way to rest point", "eating facilities at rest point", and "possible to refuel at rest point" is provided to the occupant as useful information regarding the rest point.

As illustrated in FIG. 5B, Condition 2, this being the preference level of the occupant, is stipulated for each of respective information types provided to the occupant. In cases in which there are plural comparable information types, the provision section 264, described later, references the preference levels to compare information types with a high preference level and decide which rest point to prioritize and suggest to the occupant. In the example in FIG. 5B, for categories of information that may be provided to the occupant, the preference level is set to A for eating, C for shopping, B for ease of parking, and D for scenery. The preference level is set to A for the information that is most preferable for the occupant, and the information becomes less preferable on progression through the preference levels B, C, and D. Note that information such as eating, shopping, ease of parking, and scenery is provided to the occupant as useful information regarding the rest point.

Condition 3, this being the frequency of past selection by the occupant, includes not only the frequency with which a rest point itself has been selected, but also the frequency with which similar rest points have been selected. Similar rest points refer to rest points having similar facilities, for example service areas with a fast food restaurant, or service areas with a dog run. The provision section 264, described later, compares the frequency of past selections in order to prioritize the rest point with the highest selection frequency for suggestion to the occupant.

As illustrated in FIG. 2, the communication I/F 20E is an interface for connecting with the communication device 22. For example, this interface employs a CAN communication protocol. The communication I/F 20E is connected to an external bus 20H.

The input/output I/F 20F is an interface for communicating with the GPS device 23, the touch panel 24, the speaker 26, the microphone 27, and the alertness level detection system 28 installed in the vehicle 12. Note that the GPS device 23, the touch panel 24, the speaker 26, the microphone 27, and the alertness level detection system 28 may be directly connected to the internal bus 20G Although the camera 29 of the present exemplary embodiment is directly connected to the alertness level detection system 28, the camera 29 may be connected to the alertness level detection system 28 through the input/output I/F 20F.

The communication device 22 is a wireless communication module for communicating with the agent server 14 and the information provision server 16. This wireless communication module employs a communication protocol such as 5G, LTE, or Wi-Fi (registered trademark). The communication device 22 is connected to the network N.

The GPS device 23 is a device that measures the current position of the vehicle 12. The GPS device 23 includes an antenna that receives signals from GPS satellites.

The touch panel 24 is provided to an instrument panel or the like, and is a combination of a liquid crystal display serving as a display section and a touch pad serving as an input section.

The speaker 26 is provided to the instrument panel, a center console, a front pillar, a dashboard, or the like, and is a device for outputting audio provided by the agent.

The microphone 27 is provided to a front pillar, dashboard, or the like of the vehicle 12, and is a device for picking up sounds uttered by the occupant of the vehicle 12.

The alertness level detection system 28 includes functionality to detect an alertness level of the occupant. The alertness level detection system 28 of the present exemplary embodiment detects the alertness level based on images captured by the camera 29. Methods of detecting the alertness level using a camera include a detection method based on eyeball movement, a detection method based on blinking, a detection method based on the pupils, and a detection method based on the facial expression of the occupant.

The camera 29 is provided to the instrument panel, an interior mirror, the front pillar, the dashboard, or the like, and is an imaging device that images the face of the occupant.

As illustrated in FIG. 6, by executing the processing program 100, the CPU 20A of the head unit 20 of the present exemplary embodiment functions as an alertness level acquisition section 200, a preference acquisition section 210, a search section 220, a information-gathering section 225, a route guidance section 230, a measurement section 240, an intent interpretation section 250, and an utterance control section 260. The utterance control section 260 includes a request section 262 and the provision section 264.

The alertness level acquisition section 200 serves as an acquisition section, and includes functionality to acquire the alertness level of the occupant of the vehicle 12. The alertness level acquisition section 200 of the present exemplary embodiment acquires the alertness level from the alertness level detection system 28. As previously described, the alertness level detection system 28 computes the alertness level based on images captured by the camera 29. Note that the alertness level may be detected and acquired in the head unit 20.

The preference acquisition section 210 includes functionality to acquire the preferences of the occupant. The preference acquisition section 210 of the present exemplary embodiment for example acquires a genre of information preferred by the occupant through a mobile terminal or the like in the possession of the occupant. The preference acquisition section 210 then reflects the acquired preferences of the occupant in the preference levels in the priority condition data 140.

The search section 220 includes functionality to identify a rest point at which the vehicle 12 can stop. Note that examples of rest points include parking areas, service areas, roadside cafes, convenience stores, restaurants, and public bathing facilities. In cases in which the alertness level of the occupant falls below a threshold value while traveling in the vehicle 12, the search section 220 identifies one or plural rest points on the travel route at which the vehicle 12 can stop.

The information-gathering section 225 includes functionality to gather useful information that may be useful to the occupant regarding the rest point identified by the search section 220. The information-gathering section 225 of the present exemplary embodiment acquires useful information regarding the rest point from an external server such as the information provision server 16. In cases in which plural rest points have been identified, useful information regarding each of these rest points is acquired.

The route guidance section 230 includes functionality to guide the vehicle 12 along a route to a destination set by the occupant. The route guidance section 230 of the present exemplary embodiment is capable of setting the rest point identified by the search section 220 as the destination and guiding the vehicle 12 to this destination. Note that this route guidance may be implemented by a car navigation system connected to the head unit 20.

The measurement section 240 includes functionality to measure an alertness cycle, this being a cycle lasting until the alertness level falls below a threshold value. The measurement section 240 of the present exemplary embodiment measures the alertness cycle spanning from initiation of an interaction during rousing initiation processing, described later, until the alertness level falls below the threshold value again.

The intent interpretation section 250 includes functionality to interpret the intent of an utterance by the occupant.

The utterance control section 260 serves as an utterance section, and includes functionality to control utterances with which the agent addresses the occupant. The utterance control section 260 provides audio information as information corresponding to the intent of the occupant as interpreted by the intent interpretation section 250. The utterance control section 260 also provides media content when the rousing function is being executed.

In cases in which the alertness level acquired by the alertness level acquisition section 200 is below the threshold value, the request section 262 provided at the utterance control section 260 requests an utterance from the occupant. Here, "requests an utterance" signifies prompting the occupant to make an utterance. Such utterances may include humming along to music, or singing a song.

Moreover, during alertness maintenance processing, described later, after the occupant has been notified that the destination of the vehicle 12 has been set to the rest point, the request section 262 of the present exemplary embodiment repeatedly requests the occupant to make an utterance at a predetermined interval until the vehicle 12 arrives at the destination. In the present exemplary embodiment, the "predetermined interval" refers to a playback cycle corresponding to an interval that is shorter than the alertness cycle measured by the measurement section 240.

Out of plural media contents for rousing the occupant, when requesting an utterance, the request section 262 prioritizes use of media content that rouses the occupant effectively. Specifically, the request section 262 references the rousing efficacy level data 130 for the occupant using the rousing function, and makes an utterance based on media content corresponding to a media content type with a high rousing efficacy level.

The provision section 264 serves as a proposal section that provides the occupant with the selected rest point and useful information regarding the rest point in the form of audio information. For example, the provision section 264 provides information such as the location of a service area or parking area on an expressway being traveled on, the facilities offered at this location, and the time until arrival at this location in the form of audio information. In cases in which plural rest points have been identified by the search section 220, the provision section 264 provides information regarding the rest points in a sequence determined based on the conditions stipulated in the priority condition data 140.

Control Flow

Explanation follows regarding a flow of processing executed by the head unit 20 of the present exemplary embodiment, with reference to the flowcharts in FIG. 7 to FIG. 12. The processing by the head unit 20 is implemented by the CPU 20A functioning as the alertness level acquisition section 200, the search section 220, the route guidance section 230, the measurement section 240, the intent interpretation section 250, and the utterance control section 260 described above.

First, explanation follows regarding the alertness level detection processing in FIG. 7.

At step S100 in FIG. 7, the CPU 20A determines whether or not the alertness level has fallen below the threshold value. In cases in which the CPU 20A determines that the alertness level has fallen below the threshold value (in cases in which step S100=Y), processing proceeds to step S101. In cases in which the CPU 20A determines that the alertness level has not fallen below the threshold value, namely, that the alertness level is the threshold value or greater (in cases in which step S100=N), the processing of step S100 is repeated.

At step S101, the CPU 20A detects that the alertness level has fallen.

At step S102, the CPU 20A determines whether or not the alertness level has reached the threshold value or greater. In cases in which the CPU 20A determines that the alertness level has reached the threshold value or greater (in cases in which step S102=Y), processing proceeds to step S103. In cases in which the CPU 20A determines that the alertness level has not reached the threshold value or greater, namely that the alertness level is below the threshold value (in cases in which step S102=N), the processing of step S102 is repeated.

At step S103, the CPU 20A performs a rousing efficacy evaluation. Namely, after executing media content or the like, the CPU 20A evaluates the efficacy of this media content in cases in which the alertness level that had fallen below the threshold value returns to the threshold value or greater.

At step S104, the CPU 20A stores the rousing efficacy evaluation result in the storage 20D.

At step S105, the CPU 20A determines whether or not the alertness level has fallen below the threshold value. In cases in which the CPU 20A determines that the alertness level has fallen below the threshold value (in cases in which step S105=Y), processing proceeds to step S106. In cases in which the CPU 20A determines that the alertness level has not fallen below the threshold value, namely, that the alertness level is the threshold value or greater (in cases in which step S105=N), the processing of step S105 is repeated.

At step S106, the CPU 20A measures the alertness cycle. Specifically, the CPU 20A measures the duration between step S100 and step S105 as the alertness cycle.

At step S107, the CPU 20A stores the measured alertness cycle in the storage 20D. The processing then returns to step S100.

Next, explanation follows regarding the rousing processing in FIG. 8.

At step S200 in FIG. 8, the CPU 20A executes initial settings. Specifically, the CPU 20A references the setting information 120 to acquire setting contents and personal information regarding the occupant using the rousing function, and references the rousing efficacy level data 130 to acquire the rousing efficacy level for each media content type.

At step S201, the CPU 20A determines whether or not a fall in the alertness level has been detected. In cases in which the CPU 20A determines that a fall in the alertness level has been detected (in cases in which step S201=Y), processing proceeds to step S202. In cases in which the CPU 20A determines that a fall in the alertness level has not been detected (in cases in which step S201=N), the processing of step S201 is repeated.

At step S202, the CPU 20A executes rousing initiation processing. This will be described in detail later.

At step S203, the CPU 20A executes rest proposal processing. This will be described in detail later.

At step S204, the CPU 20A determines whether or not the occupant has agreed to take a rest. Specifically, the CPU 20A determines whether or not the intent of an utterance of the occupant corresponds to agreement to take a rest. In cases in which the CPU 20A determines that the occupant has agreed to take a rest (in cases in which step S204=Y), processing proceeds to step S205. In cases in which the CPU 20A determines that the occupant has not agreed to take a rest (in cases in which step S204=N), the rousing processing is ended.

At step S205, the CPU 20A executes alertness maintenance processing. This will be described in detail later.

At step S206, the CPU 20A executes arrival stage processing. This will be described in detail later. The rousing processing is then ended.

Figure 9:
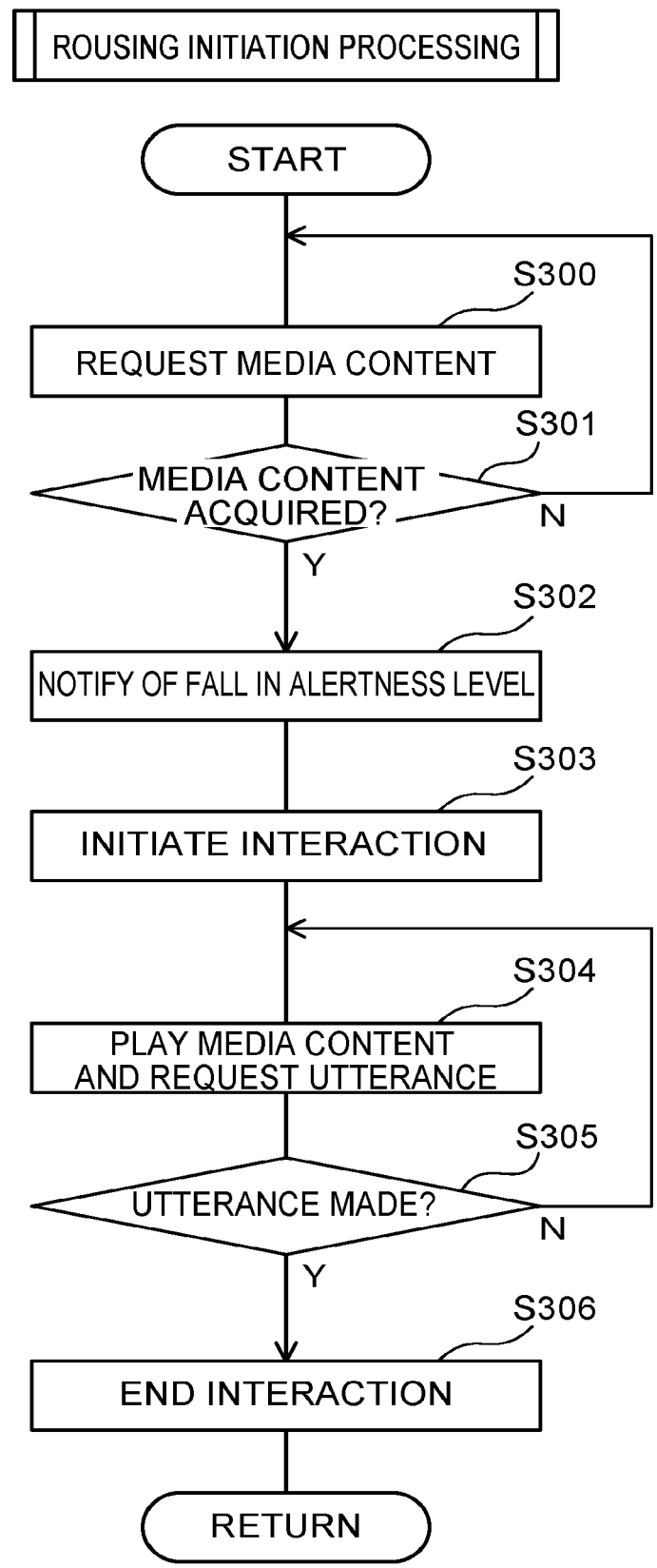
FIG. 9 is a flowchart illustrating a flow of rousing initiation processing of the first exemplary embodiment.

Next, explanation follows regarding the rousing initiation processing illustrated in FIG. 9.

At step S300 in FIG. 9, the CPU 20A requests media content. Specifically, the CPU 20A references the rousing efficacy level data 130 and loads media content with a high rousing efficacy level from the rousing media content 110. In cases in which there is no suitable media content in the rousing media content 110, media content is acquired from the information provision server 16.

At step S301, the CPU 20A determines whether or not media content has been acquired. In cases in which the CPU 20A determines that media content has been acquired (in cases in which step S301=Y), processing proceeds to step S302. In cases in which the CPU 20A determines that media content has not been acquired (in cases in which step S301=N), processing returns to step S300.

At step S302, the CPU 20A notifies of the fall in the alertness level. Specifically, the CPU 20A may play music and output audio such as "Mr. Smith, you're looking sleepy" through the speaker 26. The occupant is thereby notified that their alertness level has fallen, accompanied by the stimulus of the audible change provided by the music and calling of their name. In cases in which the vehicle 12 is being autonomously driven and the occupant is not driving, the reason and necessity of addressing the occupant may be explained, for example "Although the vehicle is being autonomously driven, you need to stay awake just in case".

At step S303, the CPU 20A initiates an interaction with the occupant. Namely, the CPU 20A starts processing to receive utterances by the occupant and interpret the intent of these utterances, and processing to provide the occupant with information relating to the interpreted intent.

At step S304, the CPU 20A plays the media content and requests the occupant to make an utterance. Specifically, the CPU 20A plays the media content acquired in the processing of step S300, and prompts an utterance in response to this media content. For example, the CPU 20A may play a song that the occupant knows and prompt the occupant to sing along at the start of the chorus. Alternatively, the CPU 20A may read from an audiobook and then prompt the occupant to repeat a read-out sentence.

At step S305, the CPU 20A determines whether or not the occupant has made an utterance. In cases in which the CPU 20A determines that the occupant has made an utterance (in cases in which step S305=Y), processing proceeds to step S306. In cases in which the CPU 20A determines that the occupant has not made an utterance (in cases in which step S305=N), processing returns to step S304.

At step S306, the CPU 20A ends the interaction with the occupant. The rousing initiation processing is then ended.

Figure 10:
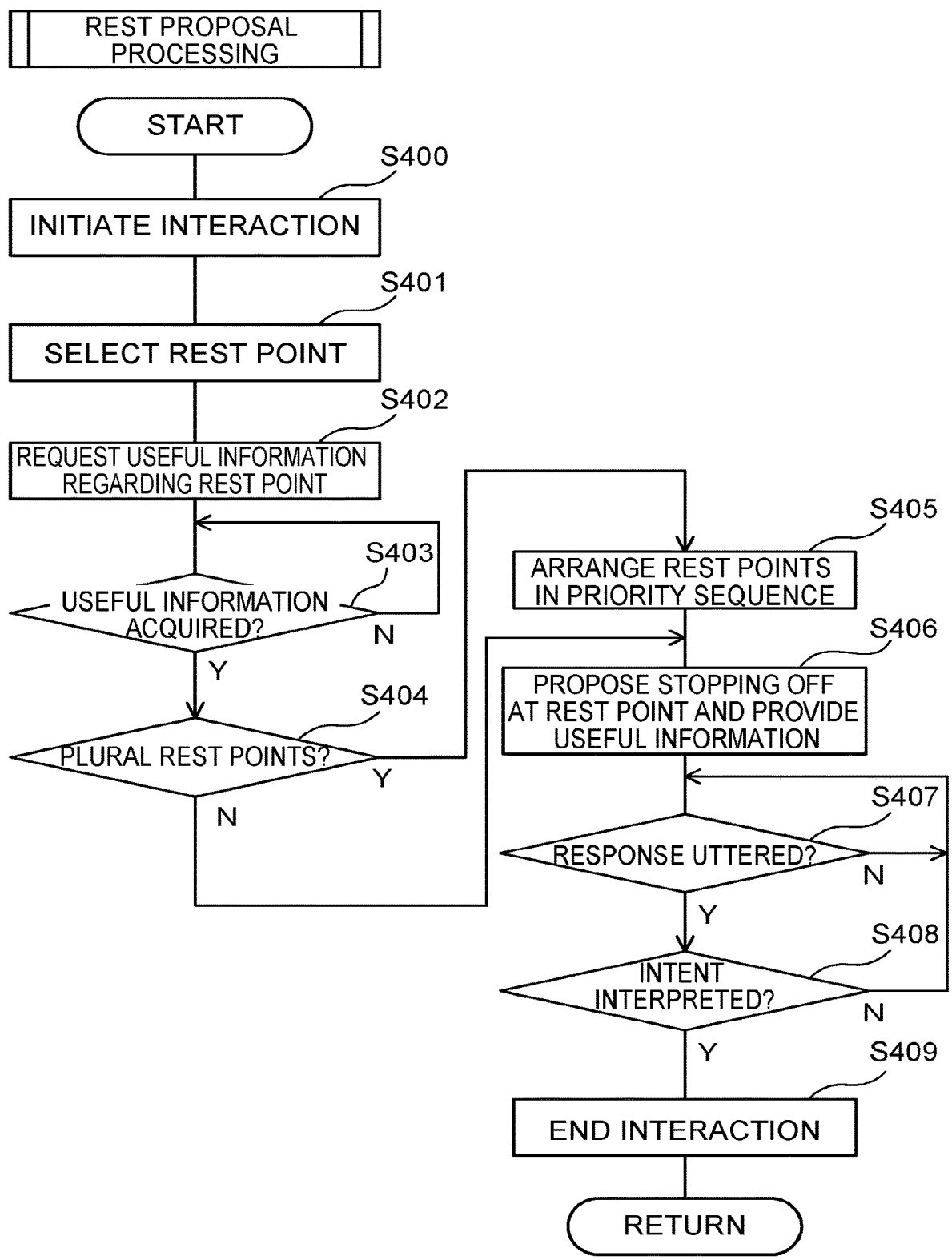
FIG. 10 is a flowchart illustrating a flow of rest proposal processing of the first exemplary embodiment.

Next, explanation follows regarding the rest proposal processing in FIG. 10.

At step S400 in FIG. 10, the CPU 20A initiates an interaction with the occupant. Namely, the CPU 20A starts processing to receive utterances by the occupant, interpret the intent of these utterances, and provide the occupant with information relating to the interpreted intent. Note that this processing relating to interaction may be continued uninterrupted from the interaction at step S306 described above.

At step S401, the CPU 20A selects available rest points. Specifically, the CPU 20A selects one or plural rest points at which the vehicle 12 can stop on the travel route of the vehicle 12. For example, in cases in which the vehicle 12 is traveling along an expressway, the CPU 20A may select a parking area or a service area on the route as a rest point.

At step S402, the CPU 20A requests useful information regarding each selected rest point from an external server such as the information provision server 16. For example, in cases in which a service area has been selected as the rest point, congestion information from the current location of the vehicle 12 to the service area, and information regarding facilities such as toilets, kiosks, and restaurants at the service area are requested from the information provision server 16.

At step S403, the CPU 20A determines whether or not the useful information has been acquired. In cases in which the CPU 20A determines that the useful information has been acquired (in cases in which step S403=Y), processing proceeds to step S404. In cases in which the CPU 20A determines that the useful information has not been acquired (in cases in which step S403=N), the processing of step S403 is repeated.

At step S404, the CPU 20A determines whether or not plural rest points have been selected. In cases in which the CPU 20A determines that plural rest points have been selected (in cases in which step S404=Y), processing proceeds to step S405. In cases in which the CPU 20A determines that plural rest points have not been selected (in cases in which step S404=N), processing proceeds to step S406.

At step S405, the CPU 20A arranges the plural selected rest points in a priority sequence. Specifically, the CPU 20A references the priority condition data 140 to arrange the rest points in consideration of the Condition 1 to Condition 3 described previously.

At step S406, the CPU 20A proposes stopping off at the rest point and provides the useful information. For example, after having explained the need to take a rest, for example with "Taking a rest is the best way to relieve drowsiness", the agent may further extol the merits of taking a rest based on useful information regarding food or shopping, for example "The cake at Ebina service area is popular. Why don't you give it a try? It could be something to tell your friends about". Lastly, the agent may make a proposal to stop off at the rest point, for example with "How about stopping off at the service area?". Note that in cases in which plural rest points have been selected, the agent proposes the rest points in the sequence in which they were arranged at step S405.

At step S407, the CPU 20A determines whether or not the occupant has uttered a response to the proposal. In cases in which the CPU 20A determines that the occupant has uttered a response to the proposal (in cases in which step S407=Y), processing proceeds to step S408. In cases in which the CPU 20A determines that the occupant has not uttered a response to the proposal (in cases in which step S407=N), the processing of step S407 is repeated.

At step S408, the CPU 20A determines whether or not the intent of the response could be interpreted. In cases in which the CPU 20A determines that the intent of the response could be interpreted (in cases in which step S408=Y), processing proceeds to step S409. In cases in which the CPU 20A determines that the intent of the response could not be interpreted (in cases in which step S408=N), processing returns to step S407.

At step S409, the CPU 20A ends the interaction with the occupant. The rest proposal processing is then ended.

Figure 11:
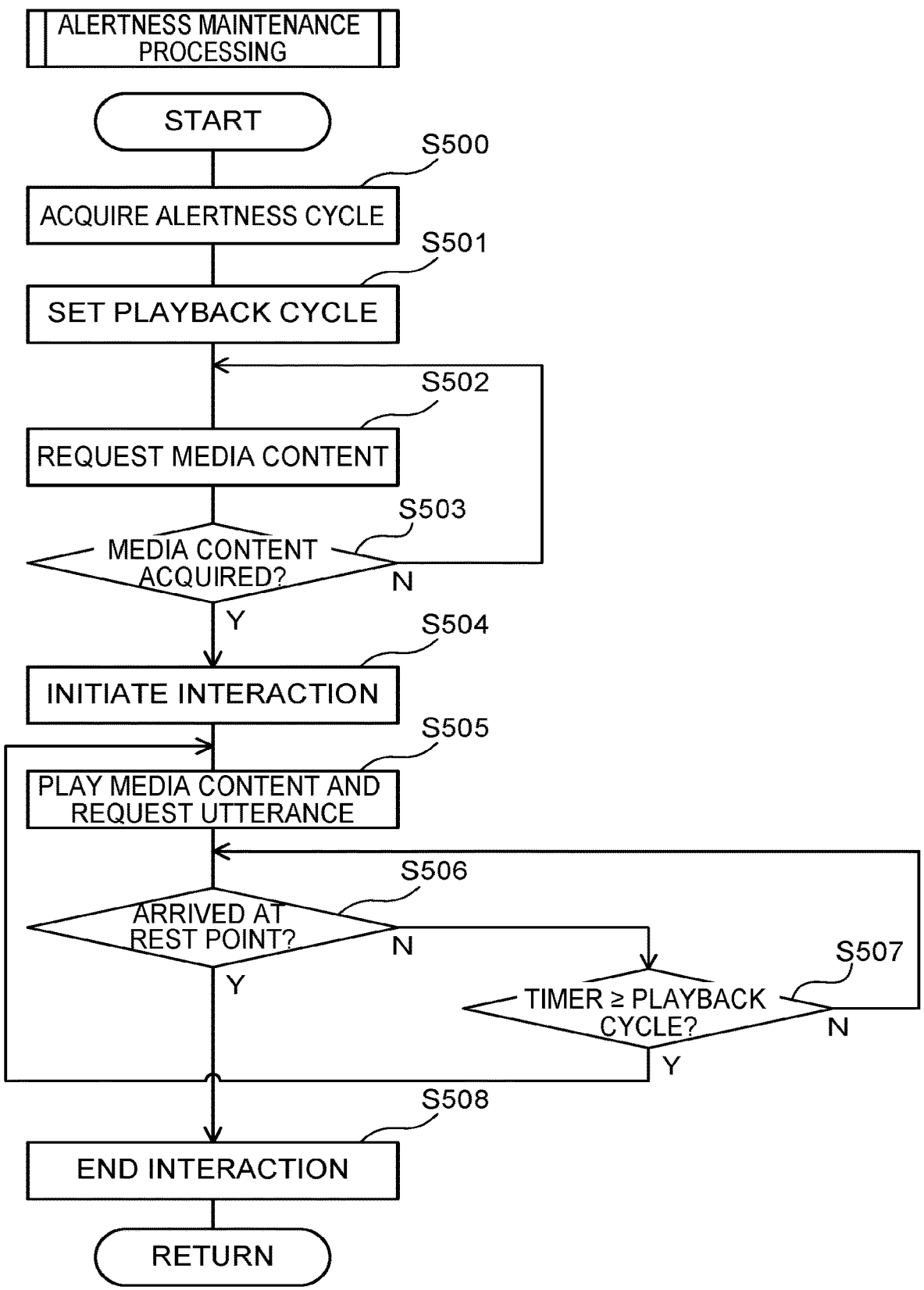
FIG. 11 is a flowchart illustrating a flow of alertness maintenance processing of the first exemplary embodiment.

Next, explanation follows regarding the alertness maintenance processing in FIG. 11.

At step S500 in FIG. 11, the CPU 20A acquires the alertness cycle stored at step S107.

At step S501, the CPU 20A sets the playback cycle. The playback cycle is set to a shorter duration than the alertness cycle. For example, the playback cycle may be set to 70% to 90% of the duration of the alertness cycle.

At step S502, the CPU 20A requests media content. Specifically, the CPU 20A references the rousing efficacy level data 130 and loads the media content with a high rousing efficacy level from the rousing media content 110. In cases in which there is no suitable media content in the rousing media content 110, media content is acquired from the information provision server 16. Note that the media content requested at step S502 may be the same as the media content requested at step S300, or may be different media content.

At step S503, the CPU 20A determines whether or not the media content has been acquired. In cases in which the CPU 20A determines that the media content has been acquired (in cases in which step S503=Y), processing proceeds to step S504. In cases in which the CPU 20A determines that the media content has not been acquired (in cases in which step S503=N), processing returns to step S502.

At step S504, the CPU 20A initiates an interaction with the occupant. Namely, the CPU 20A starts processing to receive utterances by the occupant, interpret the intent of these utterances, and provide the occupant with information relating to the interpreted intent.

At step S505, the CPU 20A plays the media content, and requests the occupant to make an utterance. Specifically, the CPU 20A plays the media content acquired in the processing of step S502, and prompts an utterance in response to this media content. For example, the agent may advise of the distance to the rest point, for example with "You could take a rest 16 km ahead at Ebina service area", and then prompt utterances on plural occasions, such as "I'll play a song every 5 minutes to keep you awake". In cases in which the agent plays songs that the occupant knows, and prompts the occupant to sing along at the start of the chorus similarly to in the rousing initiation processing, the agent may also prompt the occupant to make an utterance by saying "Let's sing along again. Not long now!". In this example, the playback cycle is set to five minutes. A timer starts counting when an utterance is requested.

At step S506, the CPU 20A determines whether or not the vehicle 12 has arrived at the rest point. In cases in which the CPU 20A determines that the vehicle 12 has arrived at the rest point (in cases in which step S506=Y), processing proceeds to step S508. In cases in which the CPU 20A determines that the vehicle 12 has not arrived at the rest point (in cases in which step S506=N), processing proceeds to step S507.

At step S507, the CPU 20A determines whether or not the count value of the timer has reached or exceeded the playback cycle. In cases in which the CPU 20A determines that the count value of the timer has reached or exceeded the playback cycle (in cases in which step S507=Y), processing returns to step S505. In cases in which the CPU 20A determines that the count value of the timer has not yet reached or exceeded the playback cycle, namely that the playback cycle has not yet elapsed (in cases in which step S507=N), processing returns to step S506.

At step S508, the CPU 20A ends the interaction with the occupant. The alertness maintenance processing is then ended.

Figure 12:
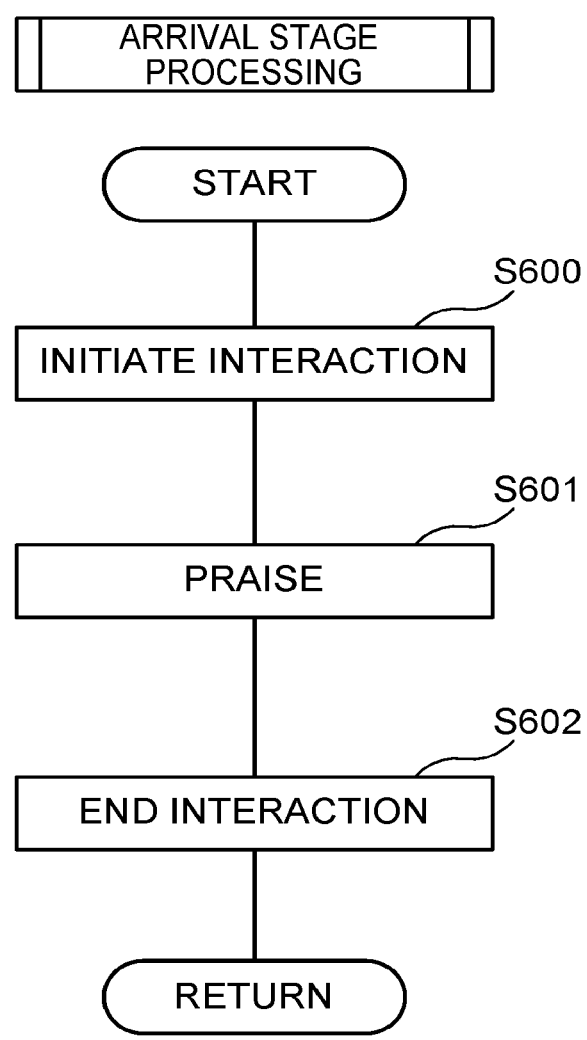
FIG. 12 is a flowchart illustrating a flow of arrival stage processing of the first exemplary embodiment.

Next, explanation follows regarding the arrival stage processing in FIG. 12.

At step S600 in FIG. 12, the CPU 20A initiates an interaction with the occupant. Namely, the CPU 20A starts processing to receive utterances by the occupant, interpret the intent of these utterances, and provide the occupant with information relating to the interpreted intent. Note that this processing relating to interaction may be continued uninterrupted from the interaction at step S508 described above.

At step S601, the CPU 20A praises the occupant. Specifically, the CPU 20A outputs audio through the speaker 26 to praise the occupant for having maintained alertness. For example, the agent may say "You've reached Ebina service area. Well done. It's been a pleasure driving with you. Take a well-deserved break and see you soon."

At step S602, the CPU 20A ends the interaction with the occupant. The arrival stage processing is then ended.

Summary of Exemplary Embodiment

In the head unit 20 of the first exemplary embodiment, the alertness level acquisition section 200 acquires the alertness level of the occupant, and then the request section 262 compares this alertness level against the threshold value and requests the occupant to make an utterance in cases in which the alertness level is below the threshold value. The search section 220 of the head unit 20 identifies a rest point at which the vehicle 12 can stop, and notifies the occupant that this rest point has been set as the destination of the vehicle 12. Moreover, the measurement section 240 of the head unit 20 measures the alertness cycle spanning from the initiation of interaction to when the alertness level falls below the threshold value again, and the request section 262 repeatedly requests an utterance according to the playback cycle that is shorter than the measured alertness cycle until the vehicle 12 arrives at the destination.

In the present exemplary embodiment, by executing repeated interactions until reaching the destination, the occupant is prompted to make a fresh utterance before their falling alertness level reaches the threshold value, based on the measured alertness level of the occupant. Namely, since drowsiness comes in cycles, the media content is used to prompt the user to make an utterance before the drowsiness reaches its peak. Thus, the present exemplary embodiment enables a rousing effect to be secured, regardless of differences between individual occupants. Moreover, prompting the occupant to make an utterance at regular intervals set based on their measured alertness level conveys the remaining time and distance to the destination to the occupant simply.

In the present exemplary embodiment, when the request section 262 requests the occupant to make an utterance, the request section 262 references the rousing efficacy level data 130 when requesting an utterance such that when employing the rousing function, the use of media content that rouses the occupant effectively is prioritized among plural media content types. The present exemplary embodiment is thereby capable of enhancing a rousing effect compared to cases in which an utterance is requested without consideration of whether or not the media content rouses the occupant effectively.

In the head unit 20 of the present exemplary embodiment, when the search section 220 identifies a rest point at which the vehicle 12 can stop, the information-gathering section 225 gathers useful information regarding the rest point that may be useful to the occupant. After interaction requesting the occupant to make an utterance has been initiated, the provision section 264 provides information regarding the rest point and the useful information to the occupant in the form of audio. In the present exemplary embodiment, making the occupant aware that their alertness level is low during an interaction and prompting the occupant to rest in the course of the interaction enables a sense of abruptness of the advice to rest or irritation at the rousing operation to be suppressed.

Second Exemplary Embodiment

A second exemplary embodiment differs from the first exemplary embodiment in the method in which media content is used. Explanation follows regarding points that differ from the first exemplary embodiment. Note that other configuration is similar to that in the first exemplary embodiment, and so detailed explanation thereof is omitted.

Both the media content employed for the rousing function, and a degree of alertness level recovery, are stored in the rousing media content 110 in the storage 20D of the present exemplary embodiment (see step S104 described previously). The request section 262 of the present exemplary embodiment references the rousing media content 110 so as to prioritize use of media content associated with a high degree of recovery when requesting an utterance.

In addition to the advantageous effects of the first exemplary embodiment, the present exemplary embodiment also exhibits the following advantageous effect. Namely, in the present exemplary embodiment, the media content used is chosen based on the past rousing effect with respect to the occupant, thereby enabling the rousing effect to be further enhanced.

Third Exemplary Embodiment

A third exemplary embodiment differs from the first and second exemplary embodiments in the method in which media content is used. Explanation follows regarding points that differ from those in the first exemplary embodiment. Note that other configuration is similar to that in the first exemplary embodiment, and so detailed explanation thereof is omitted.

The request section 262 of the present exemplary embodiment varies the media content each time an utterance request is repeated. Namely, the media content is varied each time the processing of step S505 of the alertness maintenance processing is executed.

In addition to the advantageous effects of the first exemplary embodiment, the present exemplary embodiment also exhibits the following advantageous effect. Namely, in the present exemplary embodiment, varying the media content each time an utterance request is repeated enables desensitization resulting from using the same media content each time to be suppressed.

REMARKS

Although the alertness level detection system 28 is configured by a separate device to the head unit 20 in the above exemplary embodiments, there is no limitation thereto. An alertness level detection function may be incorporated into the head unit 20. Moreover, although the camera 29 is employed to detect the alertness level in the above exemplary embodiments, there is no limitation to this detection method. For example, a detection method in which heartrate is acquired from a pressure sensor installed in a seat, a detection method based on a steering angle of a steering wheel, or a detection method based on a travel position of the vehicle 12 in a traffic lane may be adopted.

Note that the various processing executed by the CPU 20A reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

In the above exemplary embodiments, the various programs are in a format pre-stored (installed) in a computer-readable non-transitory storage medium. For example, the processing program 100 of the head unit 20 is pre-stored in the storage 20D. However, there is no limitation thereto, and the program may be provided in a format recorded on a non-transitory storage medium such as compact disc read only memory (CD-ROM), digital versatile disc read only memory (DVD-ROM), or universal serial bus (USB) memory. Alternatively, the program may be provided in a format downloadable from an external device through a network.

The flow of processing explained in the above exemplary embodiments is merely an example, and superfluous steps may be omitted, new steps may be added, or the processing sequence may be changed within a range not departing from the spirit of the present disclosure.

What is claimed is:
1. An interaction device, comprising:
a processor circuit configured to:
acquire, via a sensor provided on a vehicle, a state of an occupant of the vehicle and calculate an alertness level of the occupant based on the acquired state of the occupant;

via a speaker provided on the vehicle, output audio information to the occupant that requests an utterance from the occupant in a case in which the calculated alertness level is below a threshold value;
determine whether or not the occupant responds, via a microphone, to the request for an utterance;
determine whether or not the alertness level has recovered to the threshold value or greater as a result of requesting the utterance from the occupant;
identify a rest point at which the vehicle can stop and notify the occupant via the speaker that the rest point has been set as a destination of the vehicle;
calculate a cycle spanning from a time the alertness level was determined to have recovered to the threshold value or greater as a result of requesting the utterance from the occupant until the alertness level falls below the threshold value again; and
repeatedly output audio information that requests utterances from the occupant at a regular interval that is shorter than the calculated cycle during a time period from notifying the occupant that the rest point has been set as a destination of the vehicle to the vehicle arriving at the destination.

2. The interaction device of claim 1, wherein the processor circuit is configured to request the utterance by prioritizing use of media content that effectively rouses the occupant from a plurality of media content for rousing the occupant.

3. The interaction device of claim 2, further comprising a storage circuit, wherein:
the processor circuit is configured to store a degree of recovery of the alertness level in the storage section together with the media content used; and
the processor circuit is configured to request the utterance by referencing the storage section so as to prioritize use of media content associated with a high degree of recovery.

4. The interaction device of claim 2, wherein the processor circuit is configured to vary the media content each time an utterance request is repeated.

5. The interaction device of claim 1, wherein the processor circuit is configured to propose a plurality of the identified rest points to the occupant in a priority sequence based on one or more conditions in a case in which the processor circuit has identified a plurality of the rest points.

6. The interaction device of claim 5, wherein the processor circuit is configured to set the priority sequence by applying a degree of usefulness of the identified rest points to the occupant as one of the one or more conditions.

7. The interaction device of claim 5, wherein the processor circuit is configured to set the priority sequence by applying a preference level of the occupant regarding the identified rest points as one of the one or more conditions.

8. The interaction device of claim 5, wherein the processor circuit is configured to set the priority sequence by applying a past selection frequency by the occupant of the identified rest points as one of the one or more conditions.

9. The interaction device of claim 5, wherein the processor circuit is configured to set the priority sequence of the plurality of rest points by applying a weighting to each of a plurality of the conditions.

10. The interaction device of claim 5, wherein the processor circuit is configured to propose the rest point to the occupant together with information that is useful to the occupant.

11. The interaction device of claim 1, wherein, in a case in which the destination has been reached after requesting the utterance from the occupant, the processor circuit is configured to make an utterance praising the occupant on arrival at the destination.

12. An interaction method in which a computer executes a process comprising:
acquiring, via a sensor provided on a vehicle, a state of an occupant of the vehicle and calculating an alertness level of the occupant based on the acquired state of the occupant;
via a speaker provided on the vehicle, outputting audio information to the occupant that requests an utterance from the occupant in a case in which the calculated alertness level is below a threshold value;
determining whether or not the occupant responds, via a microphone, to the request for an utterance;
determining whether or not the alertness level has recovered to the threshold value or greater as a result of requesting the utterance from the occupant;
identifying a rest point at which the vehicle can stop and notifying the occupant via the speaker that the rest point has been set as a destination of the vehicle;
calculating a cycle spanning from a time the alertness level was determined to have recovered to the threshold value or greater as a result of requesting the utterance from the occupant until the alertness level falls below the threshold value again; and
repeatedly outputting information that requests utterances from the occupant at a regular interval that is shorter than the calculated cycle during a time period from notifying the occupant that the rest point has been set as a destination of the vehicle to the vehicle arriving at the destination.

13. A non-transitory storage medium storing a program executable by a computer to perform a process comprising:
acquiring, via a sensor provided on a vehicle, a state of an occupant of the vehicle and calculating an alertness level of the occupant based on the acquired state of the occupant;
via a speaker provided on the vehicle, outputting audio information to the occupant that requests an utterance from the occupant in a case in which the calculated alertness level is below a threshold value;
determining whether or not the occupant responds, via a microphone, to the request for an utterance;
determining whether or not the alertness level has recovered to the threshold value or greater as a result of requesting the utterance from the occupant;
identifying a rest point at which the vehicle can stop and notifying the occupant via the speaker that the rest point has been set as a destination of the vehicle;
calculating a cycle spanning from a time the alertness level was determined to have recovered to the threshold value or greater as a result of requesting the utterance from the occupant until the alertness level falls below the threshold value again; and
repeatedly outputting information that requests utterances from the occupant at a regular interval that is shorter than the calculated cycle during a time period from notifying the occupant that the rest point has been set as a destination of the vehicle to the vehicle arriving at the destination.

* * * * *